(12) United States Patent
Goodall

(10) Patent No.: US 12,202,449 B1
(45) Date of Patent: Jan. 21, 2025

(54) STABILIZING APPARATUS FOR A RECREATIONAL VEHICLE

(71) Applicant: Darius Goodall, San Jose, CA (US)

(72) Inventor: Darius Goodall, San Jose, CA (US)

( * ) Notice: Subject to any disclaimer, the term of this patent is extended or adjusted under 35 U.S.C. 154(b) by 0 days.

(21) Appl. No.: 18/641,844

(22) Filed: Apr. 22, 2024

Related U.S. Application Data

(63) Continuation-in-part of application No. 18/477,923, filed on Sep. 29, 2023.

(51) Int. Cl.
  *B60S 9/12*     (2006.01)

(52) U.S. Cl.
  CPC ..................... *B60S 9/12* (2013.01)

(58) Field of Classification Search
  CPC ...... B60S 9/08; B60S 9/04; B60S 9/06; B60S 9/12; F16M 2200/046
  See application file for complete search history.

(56) References Cited

U.S. PATENT DOCUMENTS

| | | | | |
|---|---|---|---|---|
| 2,403,338 A * | 7/1946 | Butler | ................. | A47B 87/002 16/24 |
| 2003/0209896 A1* | 11/2003 | Daniel | ................. | B60S 9/08 280/766.1 |
| 2010/0314510 A1* | 12/2010 | Munn | ................. | B60S 9/08 254/424 |
| 2014/0008905 A1* | 1/2014 | Rudy | ................. | B60S 9/08 280/766.1 |

FOREIGN PATENT DOCUMENTS

| | | | | |
|---|---|---|---|---|
| DE | 3642079 C2 * | 10/1988 | ................ | B60S 9/02 |
| EP | 0234423 A2 * | 2/1987 | ................ | B60S 9/02 |

OTHER PUBLICATIONS

Reinhold Riedl, Support for a semi-trailer adjustable in height, Sep. 2, 1987, EPO, EP 0 234 423 A2, Machine Translation of Description (Year: 1987).*

* cited by examiner

*Primary Examiner* — James A English
(74) *Attorney, Agent, or Firm* — Donald R. Boys; Central Coast Patent Agengy LLC

(57) ABSTRACT

A support assembly has a cylinder fastened to a frame, the cylinder having an extendable shaft, a foot element comprising a foot plate with a dome having a spherical shape, the dome having a central hole, an adapter element joined to a the shaft, presenting a concave surface downward having a shape of the dome, and a post with a male threaded portion at a lower end, and a key element having a conical shape with a base having a hole along an axis. The key element is under the dome, base downward, with the post passing through the hole in the key element with the key element resting on a lock nut threaded onto the post, such that with the shaft partially extended the foot element is loosely carried by the key element in contact with a lower edge of the hole of the first diameter through the dome.

9 Claims, 12 Drawing Sheets

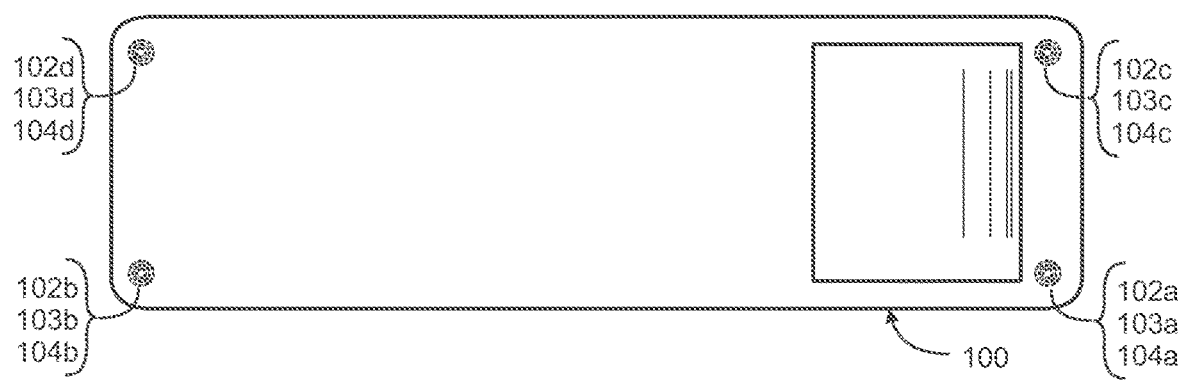
*Fig. 1A - Prior Art*
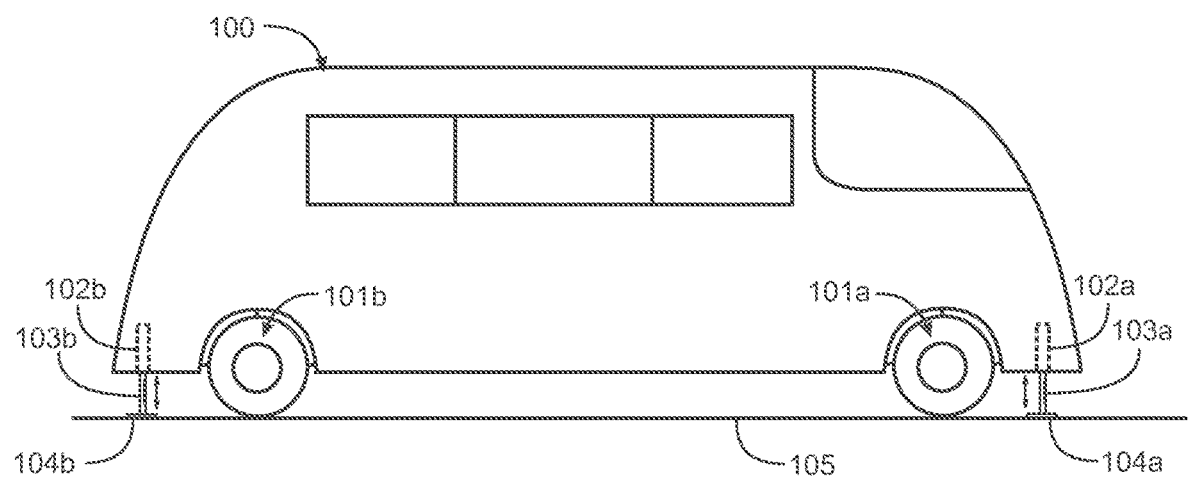
*Fig. 1B - Prior Art*

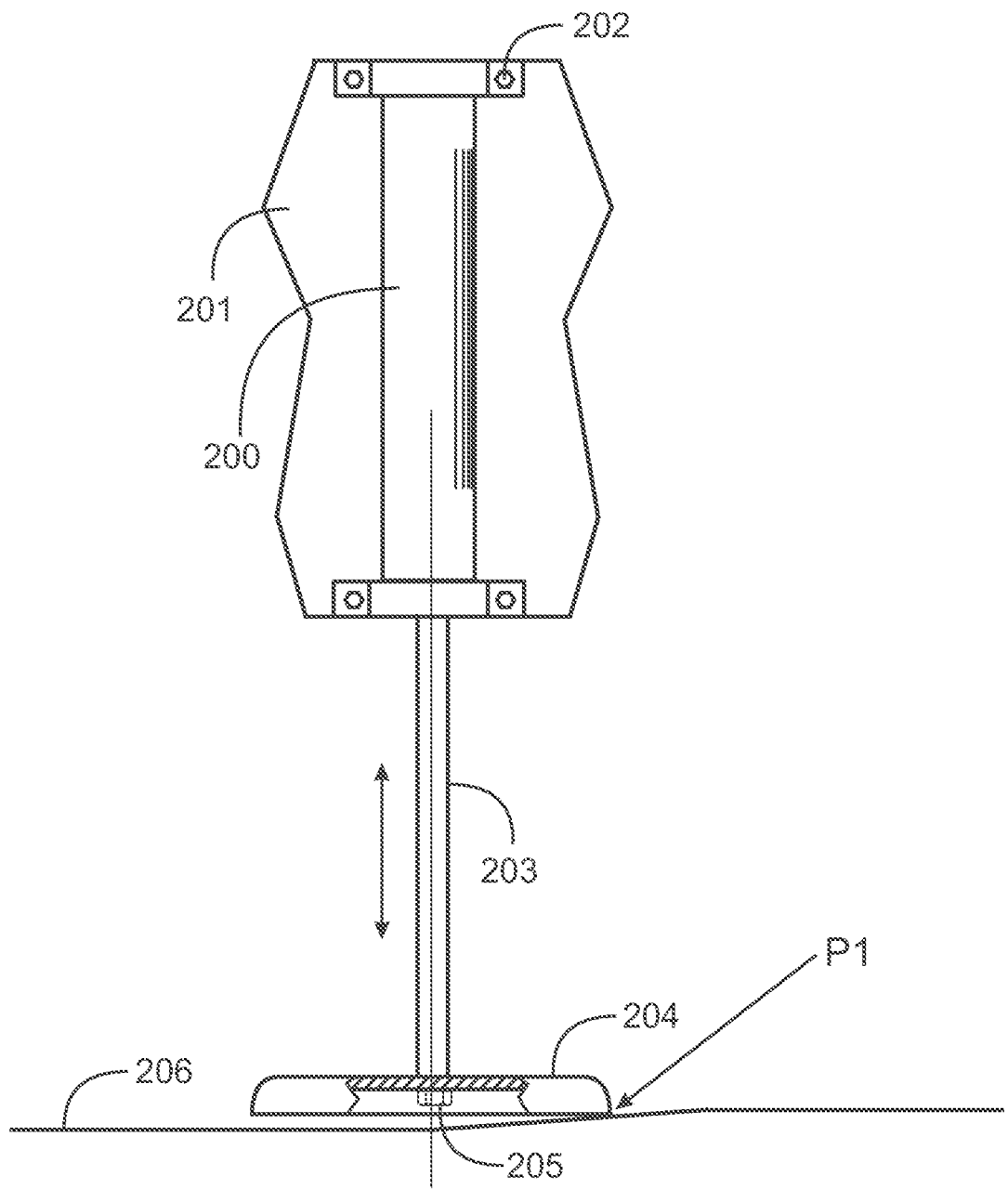
*Fig. 2 - Prior Art*

STABILIZING APPARATUS FOR A RECREATIONAL VEHICLE

CROSS-REFERENCE TO RELATED APPLICATIONS

The present application is a Continuation-in-Part of co-pending application of Ser. No. 18/477,923, filed Sep. 29, 2023. The disclosure of the parent case is incorporated herein at least by reference.

BACKGROUND OF THE INVENTION

1. Field of the Invention

The present invention is in the technical field of automotive and vehicular equipment and pertains more particularly to an extendable cylinder shaft with an articulating foot to support weight of and stabilize a vehicle.

2. Description of Related Art

It is well known in the art that many recreational vehicles (RVs) are equipped with cylinders, either pneumatic or hydraulic, often placed in corner locations, that extend shafts with feet at a lower end, such that the extended shafts urge the feet onto the ground surface to stabilize the RV while stationary so activity of persons in the RV will not deflect the suspension system and cause instability in use. By ground surface in this specification is meant the surface upon which the RV may park, whether dirt, lawn, pavement, cinders, are other surface. It is also well known that in the conventional art the feet are rigidly fixed to the shafts and are often of a structure that is insufficient to always support the weight of the vehicle without damage to the support system and/or the feet. A particular problem is that RV parks in various locales do not always have rigid and level surfaces for parking an RV, and when a cylinder shaft with a foot is extended, the foot may not contact the ground surface evenly, but may contact on an edge of the foot, causing lateral force on the extended shaft and excessive forces on parts of the foot.

What is clearly needed is a more rugged foot attached to a lower end of the cylinder shaft in a manner that the foot may articulate to an extent sufficient to allow the foot to contact the ground surface evenly.

BRIEF SUMMARY OF THE INVENTION

In one embodiment of the invention a support assembly to stabilize a vehicle is provided, comprising a cylinder fastened to a frame member of the vehicle, the cylinder having a shaft extendable vertically downward, a foot element comprising a foot plate with a centrally welded dome having a spherical shape, the dome having a central hole of a first diameter, an adapter element joined to a lower extremity of the shaft, presenting a concave surface downward having a shape of the dome, and a downward extending post with a second diameter smaller than the first diameter, with a male threaded portion at a lower end of the post, and a key element having a substantially conical shape with a base having a third diameter greater than the first diameter and a hole along an axis of the conical shape with a fourth diameter larger than the second diameter. The key element is disposed under the dome of the foot element, base downward, with the downward extending post passing through the hole in the key element with the key element resting on a lock nut threaded onto the male threaded portion of the post, such that with the shaft partially extended the foot element is loosely carried by the key element in contact with a lower edge of the hole of the first diameter through the dome.

In one embodiment the support assembly further comprises two or more additional cylinders fastened to frame members of the vehicle, each of the additional cylinders having an adapter element and a key element as in claim 1, the key element carrying a foot element as in claim 1. In one embodiment fully extending the cylinder brings the concave surface of the adapter element into contact with the dome of the foot element, the mating dome shapes allowing the foot plate to assume an angle conformal with an angle of the ground surface with level. Also, in one embodiment the assembly further comprises a v-groove at a point on the downward extending post of the adapter element, wherein extending the cylinder and urging the foot plate against a ground surface sufficiently off level to cause the downward extending post to contact an edge of the central hole in the dome, allows the post to break at the point of the v-groove.

In one embodiment the cylinder is a hydraulic cylinder. Also in one embodiment the cylinder is a pneumatic cylinder.

In another aspect of the invention a method for stabilizing a stationary vehicle is provided, comprising fastening three or more support assemblies to frame members of the vehicle, the support assemblies each having a cylinder with a shaft extendable vertically downward, a foot element comprising a foot plate with a centrally welded dome having a shape of a portion of a sphere, the dome having a central hole of a first diameter, an adapter element joined to a lower extremity of the shaft, presenting a concave surface downward having a shape of the dome, and a downward extending post with a second diameter smaller than the first diameter, with a male threaded portion at a lower end of the post, and a key element having a substantially conical shape with a base having a third diameter greater than the first diameter and a hole along an axis of the conical shape with a fourth diameter larger than the second diameter, carrying the foot elements loosely with the shafts partially extended, supported on the key elements, the shaft not in contact with the articulation plate, carrying a portion of a weight of the vehicle with the shafts fully extended and the foot element forced against a ground surface with the convex dome shape of the adapter element in contact with the dome of the foot element, and contacting the domes of the foot elements against the cylinders with the shafts retracted, securing the foot elements rigidly against the cylinders.

In one embodiment of the method cylinder is a hydraulic cylinder, and another embodiment a pneumatic cylinder.

BRIEF DESCRIPTION OF THE SEVERAL VIEWS OF THE DRAWINGS

FIG. 1A is a prior art illustration of an RV and a set of four cylinders extended with feet contacting a ground surface.

FIG. 1B is a prior art side elevation view of the RV and cylinders of FIG. 1A.

FIG. 2 is an illustration of a cylinder with extended shaft and foot contacting a ground surface in the prior art.

DETAILED DESCRIPTION OF THE INVENTION

Figure 3:
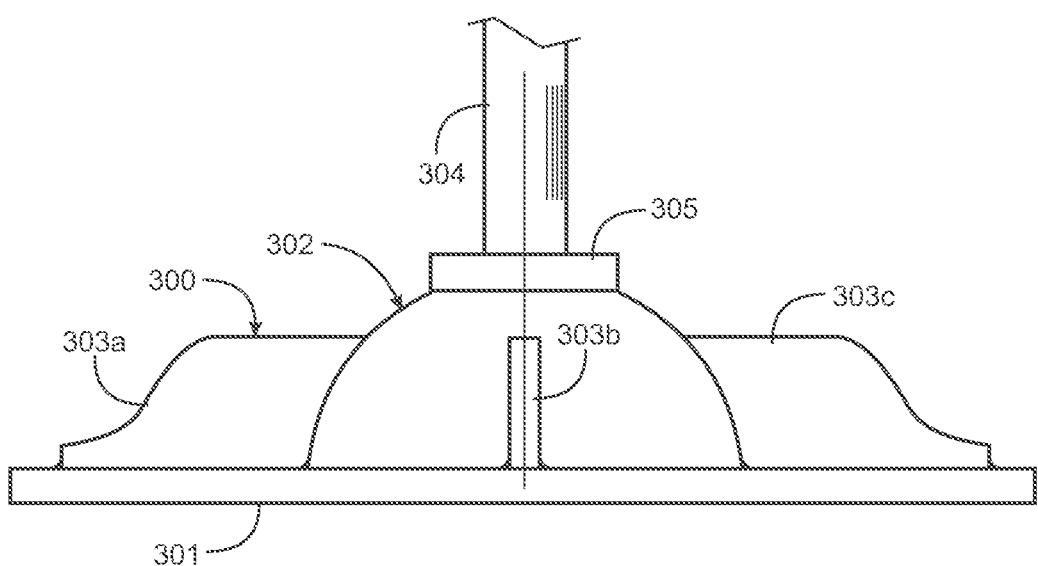
FIG. 3 is a side elevation view of an extended shaft with an articulating foot in an embodiment of the present invention.

FIG. 1A is a prior art plan view of an RV 100 and a set of four cylinders 102a-102d with cylinder shafts 103a-103d extended with feet 104a-104d contacting a ground surface 105. FIG. 1B is a prior art side elevation view of RV 100 and the cylinders, shafts and feet of FIG. 1A.

It may be seen that in this example a cylinder with an extendable shaft and a foot is implemented near each of four corners of the plan view footprint of RV 100. In alternative circumstances three sets of support cylinders might be sufficient but four is considered a better arrangement. FIG. 1B particularly shows shafts extended with feet contacting the ground surface. Typically, the shafts are extended to a degree to lift the RV against the suspension of the wheels of the RV but not enough to raise any one of the wheels off of the ground surface. With the cylinder shafts extended it is the contact of the tires of the wheels that prevents sideways motion of the RV which will put lateral stress on the cylinders. The exact placement of the cylinders may depend on the make and model of the RV, and at is only required that the four cylinders and assemblies form a stable support system for the RV.

FIG. 2 is an illustration of a cylinder 200 bolted to a frame member 201 of an RV by bolts 202, with shaft 203 fully extended and foot 204 rigidly fastened to shaft 203 by a bolt 205, contacting an uneven ground surface 206 in the prior art. The cylinder, shaft and foot in FIG. 2 may be any one of the four illustrated in FIG. 1.

It may be seen that in the circumstance of FIG. 2 foot 204 will not contact surface 206 evenly, but at first only at point P1. This is a common circumstance in the prior art, and the result is twisting of foot 204 relative to shaft 203 at the point of fastening with bolt 205, and lateral force on shaft 203 and cylinder 200. The forces created in this situation may damage the elements of the assembly and may result in unnecessary wear and early failure of the assembly.

FIG. 3 is a side elevation view of a foot 300 fastened to a cylinder shaft 304 in an embodiment of the present invention. Foot 300 is a welded assembly in this example comprising a foot plate 301, a dome 302 welded centrally to plate 301, and four reinforcing gussets of which three, gussets 303a, 303b and 303c, may be seen. In other embodiments there may be more or fewer gussets, or none at all.

The foot plate may be a circular plate with a central hole of a diameter just less than the inside diameter of a bottom of dome 302. This large hole affords access to elements under the dome in assembly and service. The gussets are welded to both dome 302 and to foot plate 301 and serve as reinforcing elements to the assembly. An articulation plate 305 is fastened rigidly to shaft 304 by a bolt (not seen in FIG. 3). Foot 302, when not in contact with a ground surface or fully withdrawn, is loosely carried and may articulate in a limited range. The specific assembly that enables articulation is described in enabling detail below with aid of cross-section drawings. The articulation plate in some circumstances is heat treated for hardness. The dome in some embodiments may be carbon steel and may also be hardened. In some embodiments the dome and the articulation plate may also be machined to provide suitable mating surfaces.

Figure 4:
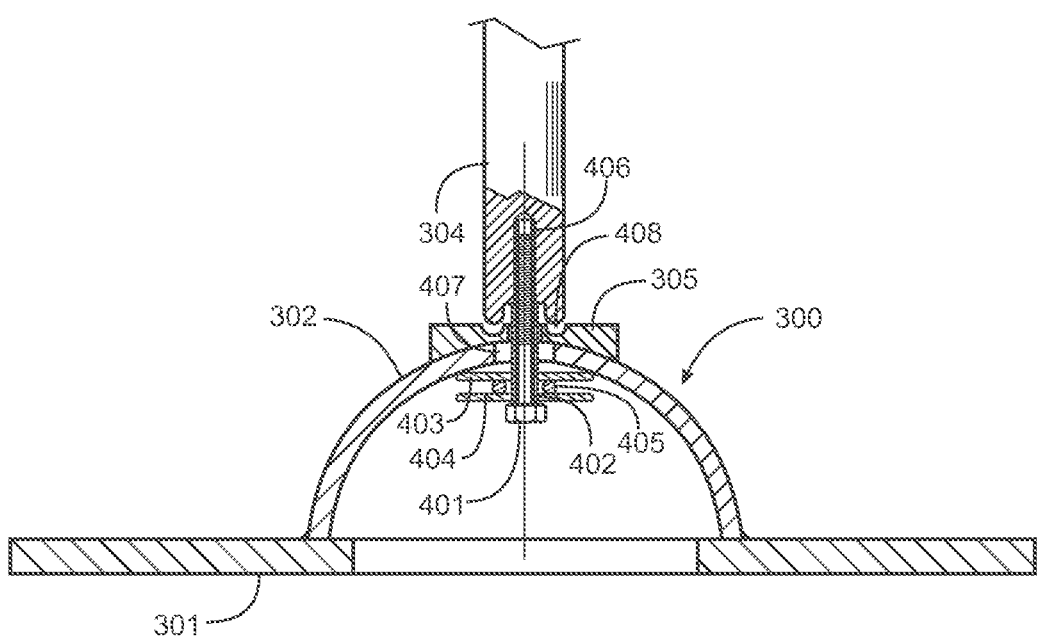
FIG. 4 is a cross-section assembly view of the extended shaft with an articulating foot of FIG. 3 with additional elements illustrating relationships of elements of the assembly.

FIG. 4 is a cross-section assembly view of the extended shaft with an articulating foot of FIG. 3 with additional elements illustrating relationships of elements of the assembly. The assembly is shown in this view in a circumstance with cylinder shaft 304 partially withdrawn (or partially extended). In this circumstance foot 300 is suspended beneath shaft 304 by a bolt 401 fully engaged in a threaded hole 406 along a longitudinal axis of the shaft from below. Bolt 401 passes through a spacer tube 402 of a certain length and is drawn up tight against the tube. The length of the spacer tube causes bolt 401 to extend a substantial length below a lower end of shaft 304. Articulation plate 305 has a center hole just larger than the outside diameter of the spacer tube and rests on a top spherical surface of dome 302 of foot 300. An underside of the articulation plate has the same spherical surface as the outer surface of the dome, and an upper surface of articulation plate 305 has a circular groove 408 that conforms in shape to the lower end of shaft 304. In this circumstance foot 300 is carried suspended on an assembly of two washers, washer 403 and washer 404, separated by an o-ring 405, and held by the head of bolt 401. Bolt 401 and spacer tube 402 pass through a hole 407 in the top of dome 302 of foot 300. Hole 407 has a substantially greater diameter than the outside diameter of spacer tube 402.

It should be apparent to the skilled person, having followed the description of the cross-section view of FIG. 4, that foot 300, with shaft 304 partially extended or retracted, is loosely held, and may articulate from the level position shown, limited by the diameter of hole 407 in the top of dome 302.

Figure 5:
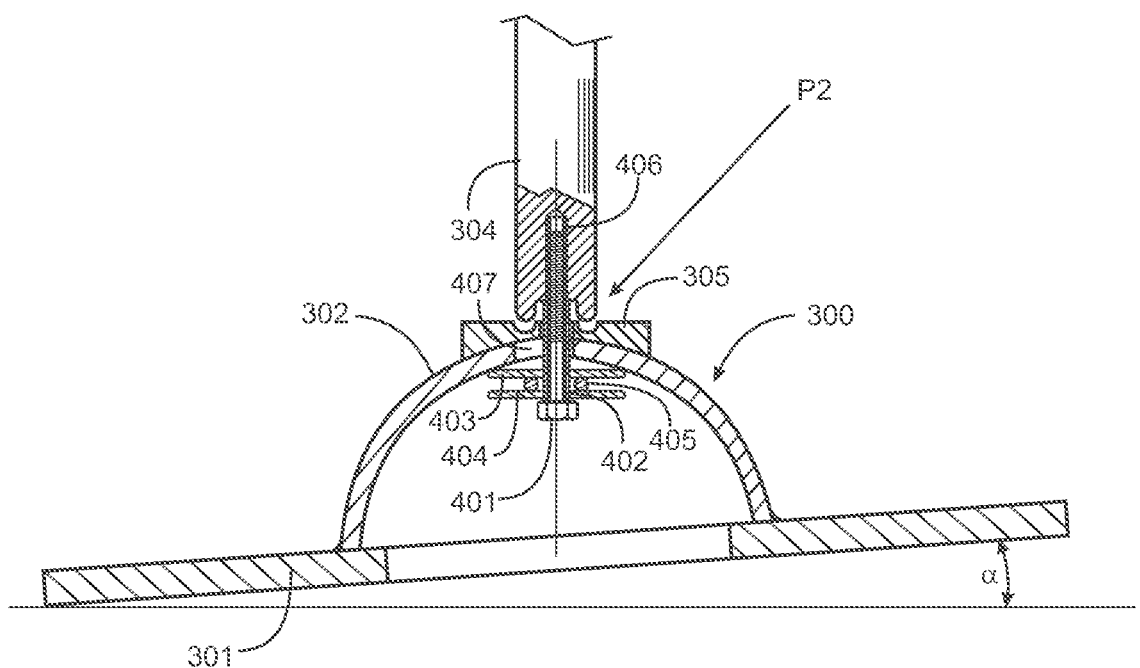
FIG. 5 is a side elevation cross-section of the assembly of FIG. 4 with the shaft fully extended urging the foot against an even ground surface at a right angle to the shaft.

FIG. 5 shows the assembly in cross-section of FIG. 4 with foot 300 rotated within the limits of hole 407. In this example the rotation of foot 300 relative to the rest of the assembly is an angle α of about 10 degrees to horizontal. It may be seen that an edge of hole 407 in dome 302 of foot 300 is in contact with spacer tube 402. In this circumstance foot 300 is still carried by washers 403, 404 and o-ring 405. It should be noted that in this circumstance there is a vertical space between the lower end of shaft 304 and a socket ring in the top of articulation plate 305 (see point P2).

Figure 6:
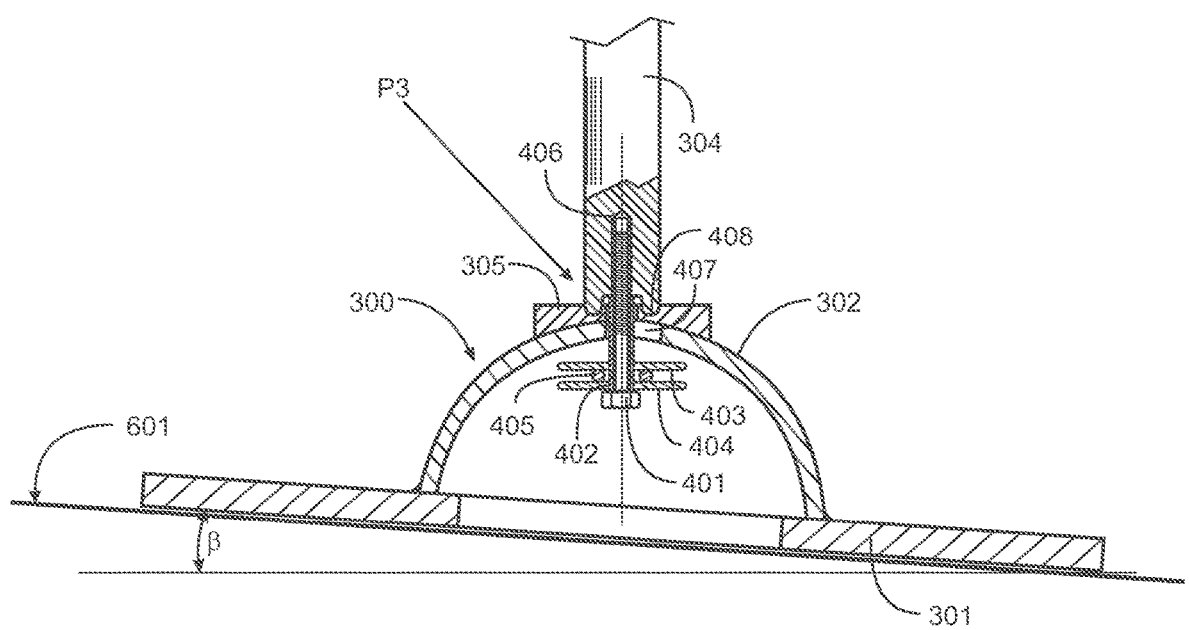
FIG. 6 is a side elevation cross-section of the assembly of FIG. 4 with the shaft fully extended urging the foot against an uneven ground surface.

FIG. 6 shows the assembly in cross-section of FIG. 5 with shaft 304 fully extended and foot 300 in contact with a ground surface 601 that is off level by angle β, also about ten degrees but in an opposite direction to angle α of FIG. 5. It may be seen that as plate 301 of foot 300 contacts ground surface 601 the foot adjusts to an articulation of angle β. Also, shaft 304 further extends until the lower end of the shaft engages circular groove 408. In this circumstance a substantial portion of the weight of RV 100 is carried by shaft 304 against articulation plate 305 which rests on dome 302 which transfers the force to plate 301 and hence to ground surface 601. It should be apparent to the skilled person that the articulation of plate 301 hence foot 300 is only limited by the inside diameter of hole 407 in dome 302, and could be greater, if needed, by providing a hole 407 with a larger diameter.

In operation the RV is parked in a preferred location, and shafts 304 of each of (usually) four cylinders are extended. The feet of each assembly contact the ground surface, articulate as needed, and lift the RV against the suspension system, leaving the tires of the wheels on the ground, preventing side motion of the RV. The RV rests on the four feet, and if needed the extension of the shafts may be adjusted to level a floor of the RV.

Figure 7:
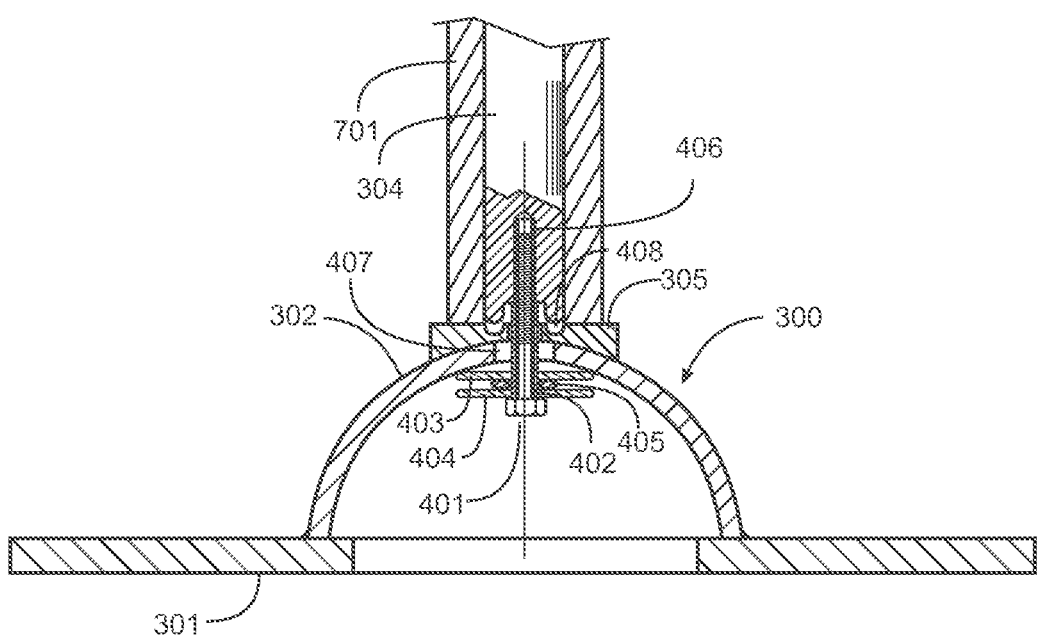
FIG. 7 is a cross-section view of the assembly of FIG. 4 with the shaft of the cylinder fully retracted.

When the RV is again to be driven away the shafts of the cylinders are retracted lowering the weight of the RV fully on its suspension system and raising the feet off the ground surface to a stowed position. FIG. 7 shows one of the cylinders with shaft fully retracted, illustrating the circumstance of each of the shafts retracted. As shaft 304 fully retracts articulation plate 305 contacts cylinder portion 701 and shaft 304 retracts a short distance further compressing o-ring 405 as shown. This action presses dome 300 against articulation plate 305 locking the foot in place in a manner that it will not move and cause vibration as the RV is driven over surfaces and roads. All four cylinders and feet are locked in place by this circumstance. At a new location the RV may be parked and the cylinder shafts extended again as described above.

In another aspect of the invention a stabilizing apparatus is provided in an alternative embodiment.

Figure 8:
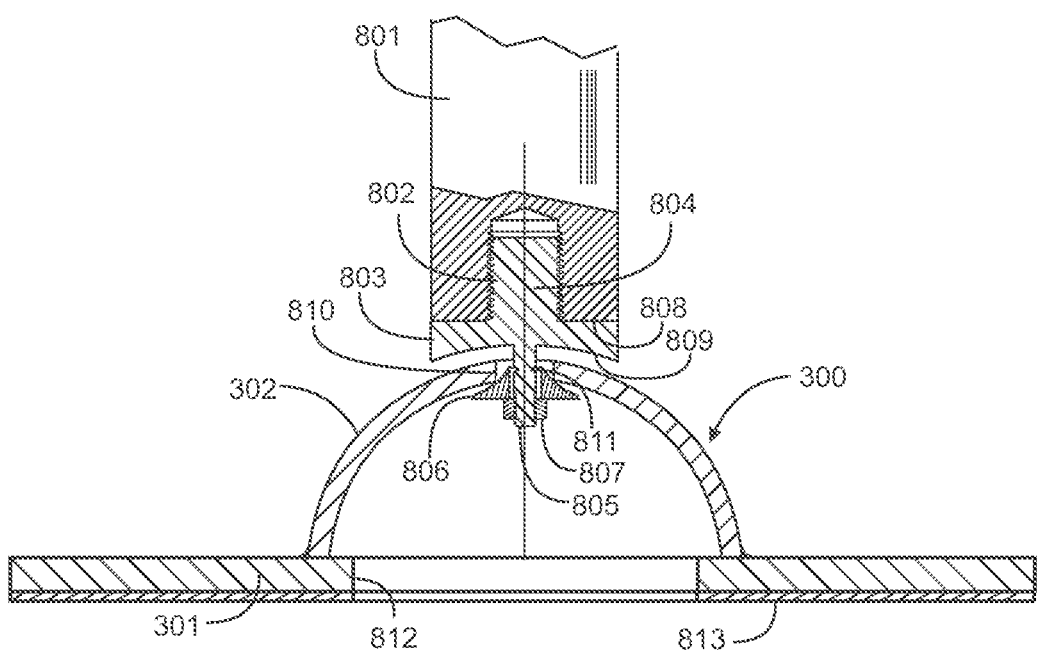
FIG. 8 is a cross-section assembly view of an extended shaft with an articulating foot and additional elements in an alternative embodiment of the invention.

FIG. 8 is a cross-section assembly view of an extended shaft 801 from a cylinder with an articulating foot 300, comprising a dome 302 and a flat foot plate 301 with a central hole 812 to allow assembly under the dome, and additional elements in an alternative embodiment of the invention. Foot plate 301 in this example has a pad 813 cut from a suitable sheet of rubber, synthetic rubber or polymer material, and adhered by such as an adhesive material to the underside of foot plate 301. The pad is to prevent or alleviate damage to concrete of other paving surfaces in use. In FIG. 8 shaft 801 may be from a pneumatic or a hydraulic cylinder as in FIG. 3, and in various circumstances the diameter of the shaft may be different. Shaft 801 in this example has a female threaded hole 802 from a lower end of the shaft. An adapter element 803 comprises a male threaded extended portion 804 with a thread compatible with female threaded hole 802, with extended portion 804 of a length lesser than the depth of threaded hole 802. Adapter element 803 further comprises a post 805 extending opposite extended portion 804, with a male thread at a lower end. Adapter element 803 in this example has an upper flat region 808. In different embodiments the end of shaft 801 may be flat, as shown, or may have another shape, such as a conical shape or a rounded shape. Flat region 808 accommodates and mates with a shaft that has a flat end. For shafts that have different shapes than flat, an adaptor may be provided that has a region 808 shaped to match the end of the shaft. The adapter element has a lower region 809 that has a spherical shape compatible with the shape of dome 302.

Adapter element 803 in this example is assembled to shaft 801 with extended portion 804 engaging threaded hole 802 until an upper region of the adapter element is urged against a bottom region of shaft 801. A keeper key 806 having a substantially conical shape and a center hole of larger diameter than post 805 is engaged over post 805 as shown with the substantially conical shape upward and is held on the post by a locknut 807 engaged to the male thread on the end of post 805.

In the aspect illustrated in FIG. 8 the cylinder is partially extended (or partially withdrawn) as was described for the cylinder in FIG. 3. In this aspect articulating foot 300 is suspended on keeper key 806 by edges of a central hole 810 through the dome, of larger diameter than post 805, and the upper region of dome 302 does not contact the lower, spherically shaped region of adapter element 803. In this aspect articulated foot 300 is free to move and tilt within limits imposed by the diameter of hole 810.

Figure 9A:
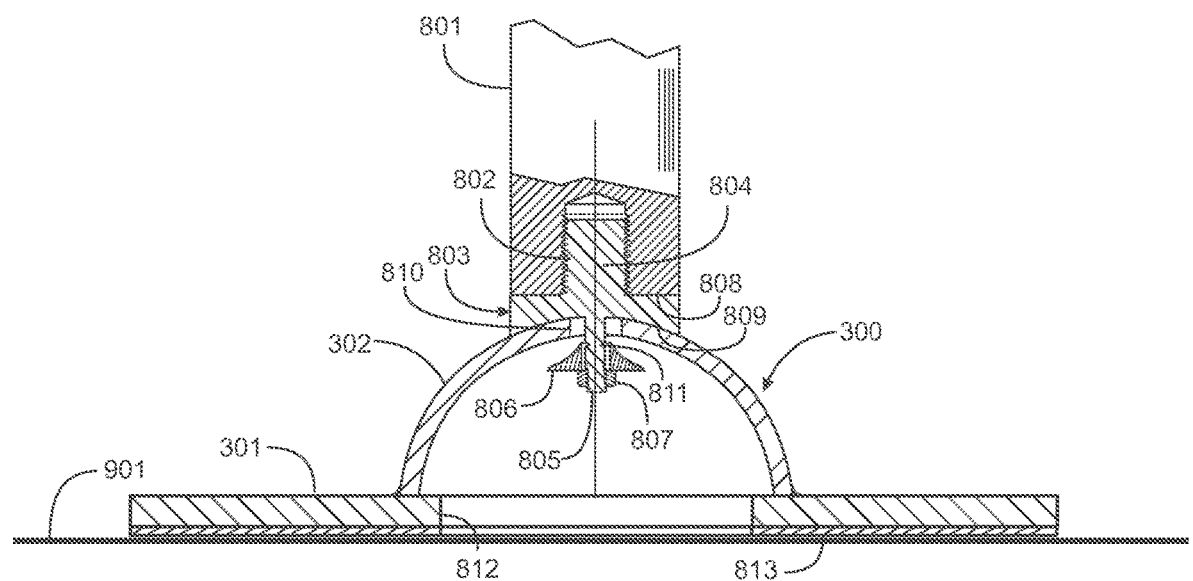
FIG. 9A is the cross-section view of FIG. 8 with cylinder shaft extended so the articulating foot is on a level ground surface.

FIG. 9A illustrates the apparatus of FIG. 8 with shaft 801 extended until foot plate 301 with pad 813 of articulating foot 300 encounters a ground surface 901, in this case a level ground surface. It may be seen that in this circumstance that spherically-shaped lower surface 809 of adapter element 803 now is in intimate contact with dome 302 of articulated foot plate 300. It was described above that the spherical shapes of the dome and the lower surface of adapter element 803 are the same shape. It may be seen as well that key element 806 is now completely clear of the underside of the dome.

Figure 9B:
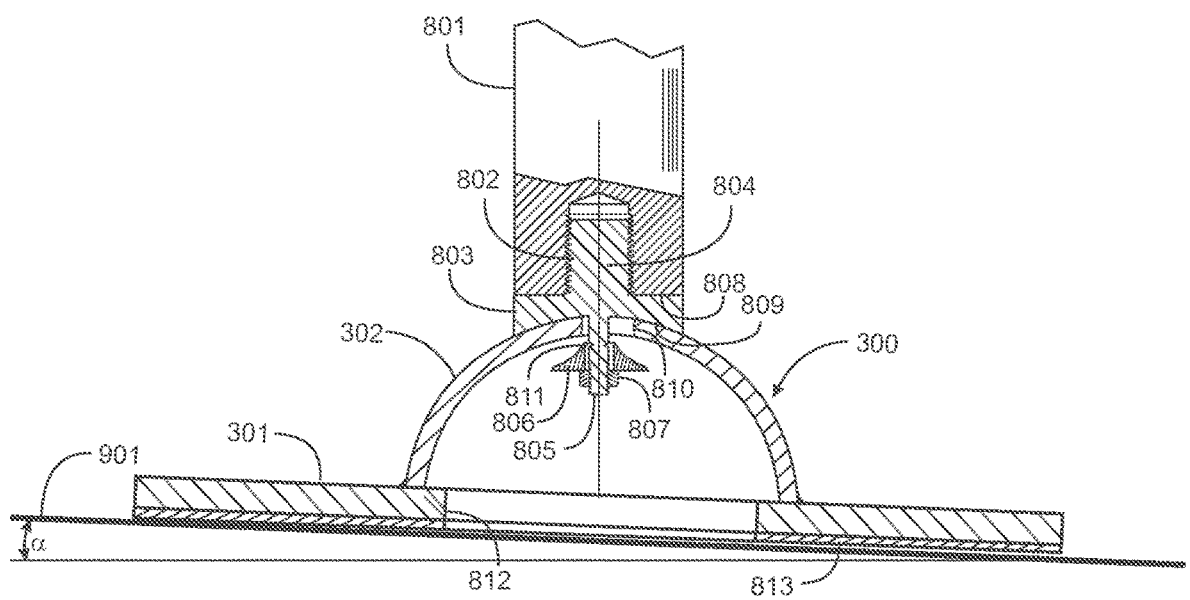
FIG. 9B is the cross section of FIG. 8 with cylinder shaft extended so the articulating foot is on a ground surface at an angle with horizontal.

FIG. 9B illustrates the apparatus of FIG. 8 with shaft 801 extended until footplate 301 encounters a ground surface that is not level, but at a small angle α to level. It may be seen that in this circumstance, that as footplate 301 encounters ground surface 901, articulated foot 300 necessarily rotates clockwise relative to adapter element 803 such that post 805 moves closer to one edge of hole 810 and away from the opposite edge. The diameter of hole 810 limits the off-level angle α that may be accommodated. If the diameter of hole 810 is increased, the off-level angle accommodated increases also.

A V-groove 811 in post 805 is provided as a safety backup in case foot 300 is extended unto a surface that is beyond the deviation from level the apparatus can accommodate, or perhaps hits a stone or other object. In this circumstance post 805 breaks off at the V-groove, and adapter 803 may be removed from the shaft and replaced.

When an RV is parked and the shafts of the cylinders are extended so the articulated feet contact the ground and compensate for not level surfaces, the RV is supported partly on the cylinders. When the RV is again to be driven away the shafts of the cylinders are retracted, lowering the weight of the RV fully on its suspension system and raising the feet off the ground surface to a stowed position. FIG. 9C shows one of the cylinders with shaft fully retracted, illustrating the circumstance of each of the shafts retracted. As shaft 304 retracts in cylinder 901 an edge of cylinder 901 encounters dome 302 of the articulated foot. The shaft 801 continues to retract, compressing rubber washer 812 until forces balance and the shaft stops retracting. This action presses dome 302 against the end of the cylinder locking the foot in place in a manner that it will not move and cause vibration as the RV is driven over surfaces and roads. All four cylinders and feet are locked in place by this circumstance. At a new location the RV may be parked and the cylinder shafts extended again as described above.

Figure 10:
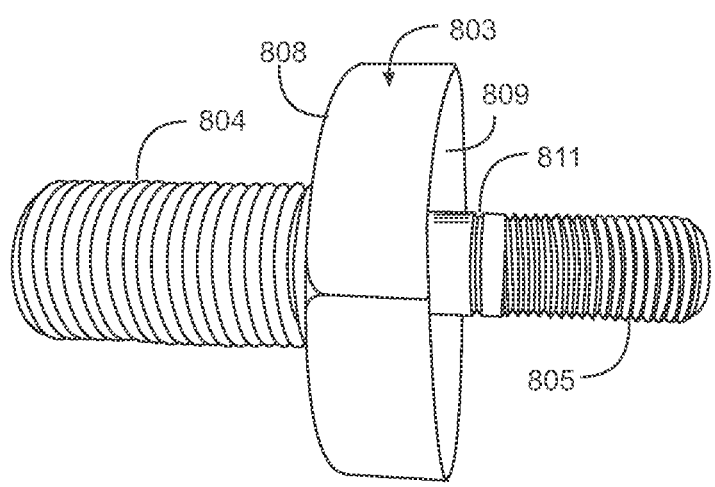
FIG. 10 is a perspective view of an adapter element in an embodiment of the invention.

FIG. 10 is a perspective view of adapter element 803 to provide additional detail. Extended threaded portion 804 and post 805 are shown extending in opposite directions and flat and spherical portions 808 and 809 are shown as well. V-groove 811 is shown around post 805.

Figure 11:
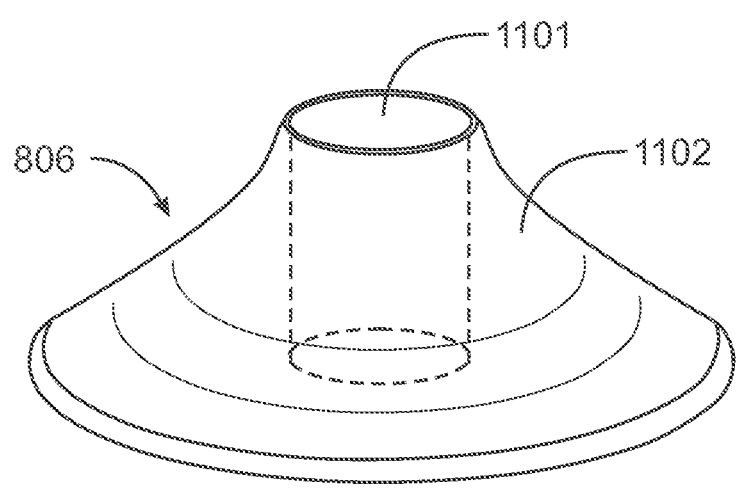
FIG. 11 is a perspective view of a key element in an embodiment of the invention.

FIG. 11 is a perspective view of keeper key 806 illustrating the conical nature. There is a vertical through hole 1101 to accommodate post 805 in assembly. In one embodiment substantially conical surface 1102 is somewhat curves as well, as shown.

A skilled artisan will understand that the descriptions above are for embodiments of the invention that are examples and are not limiting to the scope of the invention. There are many alterations that may be made depending, for example, on the RV involved, the characteristics of the cylinders. The design of the feet and other factors, all within the scope of the invention. The scope of the invention is limited only by the claims that follow.

The invention claimed is:

1. A support assembly to stabilize a vehicle, comprising:
a cylinder fastened to a frame member of the vehicle, the cylinder having a shaft extendable vertically downward;
a foot element comprising a circular foot plate having a first diameter with a concentric circular opening of a second diameter through the foot plate, a dome having a shape of a portion of a hollow sphere with a third outside diameter substantially smaller than the first diameter of the foot plate and a fourth inside diameter larger than the second diameter of the circular opening through the foot plate, the dome welded curve upward directly to the foot plate, concentric with the circular shape of the foot plate, with a vertical hole of a fifth diameter through a top of the dome;
an adapter element joined to a lower extremity of the shaft, presenting a concave surface downward having a shape of the dome, and a downward extending post with a sixth diameter smaller than the fifth diameter, with a male threaded portion at a lower end of the post; and
a rigid key element having a substantially conical shape with a base having a seventh diameter greater than the fifth diameter and a hole along an axis of the conical shape with an eighth diameter greater than the sixth diameter;
wherein the key element is disposed under the dome of the foot element with the base of the key element downward, with the downward extending post passing through the hole in the key element with the key element resting on a lock nut threaded onto the male threaded portion of the post, such that with the shaft partially extended the foot element is loosely carried by the key element in contact with a lower edge of the hole of the fifth diameter through the top of the dome.

2. The support assembly of claim 1 further comprising two or more additional cylinders fastened to frame members of the vehicle, each of the additional cylinders having an adapter element and a key element as in claim 1, the key element carrying a foot element as in claim 1.

3. The support assembly of claim 1 wherein fully extending the cylinder brings the concave surface of the adapter element into contact with the dome of the foot element, the mating dome shapes allowing the foot plate to assume an angle conformal with an angle of the ground surface with level.

4. The support assembly of claim 1 further comprising a v-groove at a point on the downward extending post of the adapter element, wherein extending the cylinder and urging the foot plate against a ground surface sufficiently off level to cause the downward extending post to contact an edge of the central hole in the dome, allows the post to break at the point of the v-groove.

5. The support assembly of claim 1 wherein the cylinder is a hydraulic cylinder.

6. The support assembly of claim 1 wherein the cylinder is a pneumatic cylinder.

7. A method for stabilizing a stationary vehicle, comprising:
fastening three or more support assemblies to frame members of the vehicle, the support assemblies each having a cylinder with a shaft extendable vertically downward, a foot element comprising a circular foot plate with a first diameter with a centrally welded dome having a shape of a portion of a sphere having an outside diameter substantially smaller than the first diameter, the dome having a central vertical hole of a second diameter, an adapter element joined to a lower extremity of the shaft, presenting a concave surface downward having a shape of the dome, and a downward extending post with a third diameter smaller than the second diameter, with a male threaded portion at a lower end of the post, and a rigid key element having a substantially conical shape with a base having a fourth diameter greater than the second diameter and a hole along an axis of the conical shape with a fifth diameter larger than the third diameter;
carrying the foot elements loosely with the shafts partially extended, supported on the key elements;
carrying a portion of a weight of the vehicle with the shafts fully extended and the foot elements forced against a ground surface with the convex dome shape of the adapter elements in contact with the dome of the foot elements; and contacting the domes of the foot elements against the cylinders with the shafts retracted, securing the foot elements rigidly against the cylinders.

8. The method of claim 7 comprising providing the cylinder as a hydraulic cylinder.

9. The method of claim 7 comprising providing the cylinder as a pneumatic cylinder.

* * * * *